Aug. 14, 1934.  J. L. COLLINS  1,970,168
MEAT COOKER ADJUSTER
Filed Aug. 24, 1931

Joel L. Collins.
INVENTOR

WITNESS

BY
ATTORNEY

Patented Aug. 14, 1934

1,970,168

UNITED STATES PATENT OFFICE 1,970,168

MEAT COOKER ADJUSTER

Joel L. Collins, Baltimore, Md., assignor, by mesne assignments, to Industrial Patents Corporation, Chicago, Ill., a corporation of Delaware Application August 24, 1931, Serial No. 558,960

2 Claims. (Cl. 100—57)

This invention relates to boilers, such as generally provided for cooking hams and other meat after the bone, skin and surplus fat have been removed, and in which the meat is confined under pressure during the cooking process to maintain a predetermined shape for convenience of slicing.

The pieces of meat to be cooked vary in bulk and shape and, to obviate the necessity of providing different sizes of boilers, the present invention contemplates an adjuster to be placed in a meat boiler and adapt the cooker to different sizes of meat, which, when cooked, will be of a shape to be cut into desirable slices.

The device comprises a self-adjusting wall of sectional formation, a spacer for positioning the wall a given distance from a side of the cooker, and a spring for holding the wall extended to maintain it in contact with the bottom and follower or plunger of the cooker.

In the preferred construction, the adjuster is hollow to house and protect the spring and spacing means, and comprises complemental parts having a telescopic arrangement, each part including spaced side walls and a connecting wall, and preferably formed from a sheet metal blank folded upon itself, the connecting wall constituting the spacing means.

It is obvious that the invention is susceptible of a variety of modifications, some of which are illustrated in the drawing hereto attached, and on reference thereto, Figure 1 is a perspective view, partly in section, illustrative of an applied embodiment of the invention.

Corresponding and like parts are referred to in the following description and indicated in the several views of the drawing by like reference characters.

The numeral 1 designates a meat boiler, cooker or mold, such as generally provided for cooking ham or other meat in the formation of a loaf. Associated with the boiler 1 is the usual follower 2 for confining the meat during the process of cooking. These parts may be of any construction and are illustrated to demonstrate the application of the invention.

The adjuster constituting the subject matter of the present invention is adapted to be placed within the boiler or cooker to reduce the capacity so as to adapt the container to the piece of ham or other meat to be cooked.

Figure 1:
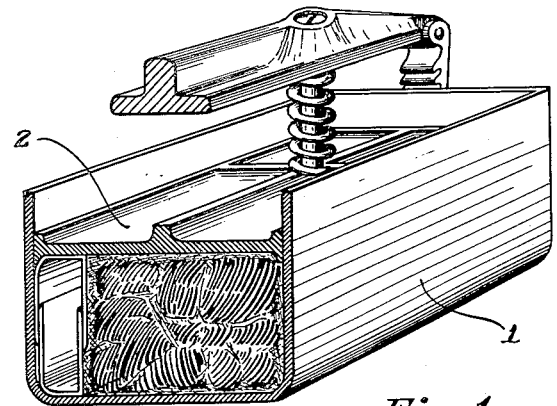
Figure 4:
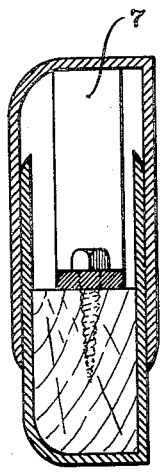
Fig. 4 is a sectional view on the line 4—4 of Fig. 3.
Figure 2:
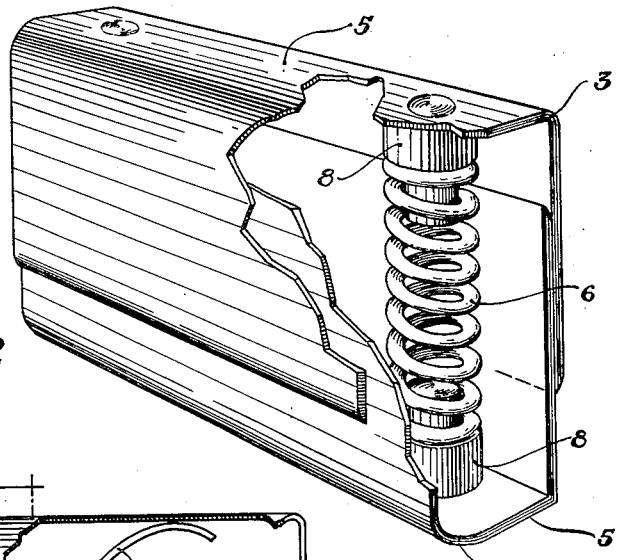
Fig. 2 is a detail perspective view of the adjuster, parts being broken away.
Figure 3:
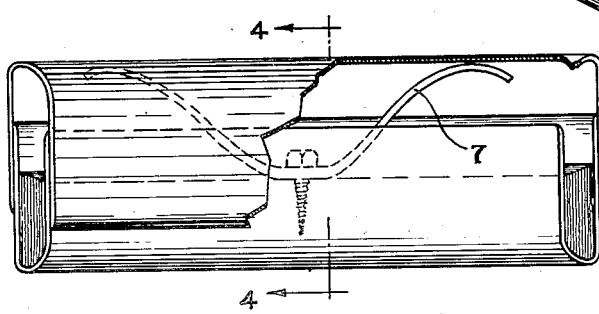
Fig. 3 is a perspective view of a modification.

This adjuster is expansible and comprises sections which are normally pressed apart by means of a spring which may be of any determinate form. As illustrated, the adjuster comprises similar sections 3 and 4 which constitute a wall to coact with a wall of the boiler or cooker to confine the meat to form a loaf of required size. The adjuster is illustrated as embodying a hollow construction which is preferred since it forms a housing for the coacting spring and spacing means consisting of a bar 9 of wood conforming to and fitting against the bottom of the lower section of the adjuster. The spacing bar has flat side faces 10 and is of a thickness to extend across the space between the sides of a lower section of the adjuster and it is of sufficient height to extend above the plane of the lower edges of the sides of the upper section. The sides of the upper and lower sections are overlapped in their telescoping relation and the spacing bar extending between the sides of the lower section at the said overlapped portions and thereby spaces the sides of both the upper and lower portions and prevents their collapsing under the pressure exerted on the meat in the boiler and at the same time does not interfere with the relative sliding movement of the upper and lower sections. Each of the sections or parts 3 and 4 comprises spaced walls and a connecting wall 5, the several parts forming elements of a sheet metal blank which is doubled or folded upon itself into substantially U-shape. The sections or parts 3 and 4 have a telescopic arrangement and are pressed apart by an interposed coiled spring 6 or a flat spring 7. The spacing bar 9 is provided with a flat upper face and the flat spring which is approximately V-shaped is secured at its center at 12 to the flat upper face 11 of the spacing bar which supports the flat spring 7 as clearly illustrated in Fig. 3 of the drawing. The sides of the V-shaped spring 7 yieldably support the upper section of the adjuster. In the form utilizing coiled springs 6, guides 8 are provided and attached to the connecting walls 5, said guides having reduced portions to enter the ends of the coiled springs 6 and retain them in place. The hollow formation of the adjuster insures a light structure and results in the provision of an article which may be cheaply manufactured.

It is observed that the adjuster is adapted to be provided in different sizes, thereby admitting of a particular size being selected and placed in position wthin the boiler or cooker 1 to provde a meat loaf of required size depending upon the size of meat to be cooked. After the selected adjuster has been placed in position in the boiler the meat to be cooked is placed in the space provided between the adjuster and the opposite side of the container, said meat being compressed in the well known manner by the follower 2 which also contracts the adjuster to the depth of the meat corresponding to the size of the loaf after the meat has been cooked.

It is obvious that the invention precludes the necessity of providing different sizes of meat boilers, cookers or molds since an adjuster of required size may be selected and placed in position within the cooker, thereby adapting the latter to the size of the meat or other article to be cooked.

What is claimed is:

1. An adjuster to be placed within a meat boiler or cooker to reduce the capacity thereof according to the size of the meat to be cooked, said adjuster comprising a sectional wall comprising upper and lower reversely arranged substantially U-shaped sections each consisting of a single piece of sheet metal and having spaced sides and a connecting portion, the sides of the upper and lower sections being overlapped and the sections being relatively slidable on each other, and a coacting spring for normally holding the wall extended, and spacing means associated with the wall sections to position said wall a given distance from the wall of the cooker against which the adjuster may be placed, said spacing means consisting of a bar of a thickness equal to the space between the sides of the lower section of the adjuster and extending upwardly from the bottom thereof to a point above the plane of the lower edges of the sides of the upper section and spacing the sides of both the upper and lower sections without interfering with their relative sliding movement.

2. An adjuster to be placed within a meat boiler or cooker to reduce the capacity thereof according to the size of the meat to be cooked, said adjuster comprising upper and lower reversly arranged substantially U-shaped sections, each consisting of a single piece of sheet metal and having spaced sides and a connection portion, the sides of the upper and lower sections being arranged in overlapping relation and having relative slidable movement, a spacing bar arranged within the lower section and being of a width to extend across the same and having flat faces abutting the sides of the lower sections, said bar being of a height to extend from the bottom of the lower section to a point above the plane of the lower edges of the sides of the upper section and spacing the sides of the upper and lower sections without interfering with the relative slidable movement thereof, and a substantially V-shaped spring centrally secured to the upper face of the spacing bar and having its sides fitted against the connecting portion of the upper section and yieldably supporting the latter.

JOEL L. COLLINS.